US008502688B2

(12) United States Patent
Suthar et al.

(10) Patent No.: US 8,502,688 B2
(45) Date of Patent: Aug. 6, 2013

(54) STANDALONE SELF-SUPPLIED NUMERIC CONTROLLED RELAY

(75) Inventors: Niraj Suthar, Gujarat (IN); Vijay Shah, Gujarat (IN); Maulik Vyas, Gujarat (IN); Bernhard Deck, Weilheim (DE)

(73) Assignee: ABB Technology Ltd, Zürich (CH)

( * ) Notice: Subject to any disclaimer, the term of this patent is extended or adjusted under 35 U.S.C. 154(b) by 542 days.

(21) Appl. No.: 12/857,169

(22) Filed: Aug. 16, 2010

(65) Prior Publication Data
US 2011/0025515 A1 Feb. 3, 2011

Related U.S. Application Data

(63) Continuation of application No. PCT/IB2008/000439, filed on Feb. 15, 2008.

(51) Int. Cl.
| G08B 29/00 | (2006.01) |
| G08B 21/00 | (2006.01) |
| H02H 3/00 | (2006.01) |
| H01H 47/00 | (2006.01) |
| G05B 15/00 | (2006.01) |
| F23N 5/20 | (2006.01) |
| F23Q 9/08 | (2006.01) |

(52) U.S. Cl.
USPC ........... 340/660; 340/661; 340/662; 340/642; 340/516; 340/641; 361/42; 361/86; 361/166; 361/167; 361/93.1; 700/1; 700/7; 700/8; 700/10; 431/24; 431/45; 431/60; 307/132 E (58) Field of Classification Search
USPC ........................................................ 340/660
See application file for complete search history.

(56) References Cited

U.S. PATENT DOCUMENTS

| 4,077,055 | A | 2/1978 | Wilson et al. |
| 5,179,495 | A | 1/1993 | Zuzuly |
| 5,555,483 | A * | 9/1996 | Pressman et al. ............... 361/90 |
| 6,055,145 | A | 4/2000 | Lagree et al. |
| 6,421,216 | B1 | 7/2002 | Myong et al. |
| 6,459,557 | B1 | 10/2002 | Haensgen et al. |
| 6,888,712 | B2 | 5/2005 | Holce et al. |

(Continued)

FOREIGN PATENT DOCUMENTS

| CN | 1738125 A | 2/2006 |
| DE | 32 23 687 A1 | 1/1984 |

(Continued)

OTHER PUBLICATIONS

International Search Report (PCT/ISA/210) for PCT/IB2008/000439 dated Oct. 20, 2008.

*Primary Examiner* — Jennifer Mehmood
*Assistant Examiner* — Fekadeselassie Girma
(74) *Attorney, Agent, or Firm* — Buchanan Ingersoll & Rooney PC (57) ABSTRACT

The disclosure relates to a process of configuring a standalone self-supplied numeric controlled relay for providing phase and earth over current protection to electrical systems by accurate current measurement. The arrangement for current measurement with control algorithms is provided for power control by providing amplified and conditioned current for optimization between the current to power an electronic circuit and the fidelity of a measured current waveform so that they both are at the acceptable levels at the same time. This disclosure describes the current sensing and associated algorithm for power control in a truly self-powered relay.

20 Claims, 7 Drawing Sheets

U.S. PATENT DOCUMENTS

| | | |
|---|---|---|
| 7,016,174 B2 | 3/2006 | Dougherty |
| 7,031,131 B2 | 4/2006 | Kudo et al. |
| 7,248,451 B2 | 7/2007 | Bax et al. |
| 7,271,579 B2 * | 9/2007 | Shimada et al. ............. 324/119 |
| 7,301,468 B2 * | 11/2007 | Pai ............................... 340/655 |
| 7,304,828 B1 | 12/2007 | Shvartsman |
| 2006/0007627 A1 * | 1/2006 | Lewis ........................... 361/160 |
| 2006/0050464 A1 | 3/2006 | Von Arx et al. |
| 2008/0094768 A1 * | 4/2008 | Perra et al. .................... 361/79 |

FOREIGN PATENT DOCUMENTS

| | | |
|---|---|---|
| EP | 0 469 207 A2 | 2/1992 |
| RU | 2 179 775 C2 | 2/2002 |
| WO | WO 2007/114951 A2 | 10/2007 |

* cited by examiner

STANDALONE SELF-SUPPLIED NUMERIC CONTROLLED RELAY

RELATED APPLICATION

This application claims priority as a continuation application under 35 U.S.C. §120 to PCT/IB2008/000439 filed as an International Application on Feb. 15, 2008 designating the U.S., the entire content of which is hereby incorporated by reference in its entirety

FIELD

The present disclosure relates generally to circuit interruption arrangements, such as current measurement and sensing arrangements used by circuit breakers and overload/overcurrent relays which are powered from the circuit path they are arranged to interrupt (self-powered).

BACKGROUND INFORMATION

The use of relays is widespread in modern-day residential, commercial and industrial electric systems, and they constitute an indispensable component of such systems for providing protection against over-current conditions and earth-fault protection. In power system protection, static auxiliary powered relays for over-current and earth-fault protection are used. In such designs, the source of energy used by an electronics circuit is independent of current sensors. The current sensors in this situation encounter very low and constant burden and small linearity range, for example 20 times the nominal design current, which facilitates freeing the secondary current waveform of any significant distortion. The current sensors are therefore light in weight and smaller in size. Also the current sensors follow primary high current sensors.

For measurement of the current through the current sensors, the control electronics derives the operating power from an auxiliary power supply, which facilitates realization of an active filter design including signal conditioning. The auxiliary power supply supplements use of a dual polarity voltage supply, enabling implementation of simple and active filter conditioning. The high power demand of an electronics circuit can be supplied easily. In other words, a design flexibility in terms of components selection and features to be embedded is available.

There are however certain situations, where an installation can encounter constraints for supporting an auxiliary power supply for the relay operation (e.g., for Ring Main Units installation in urban cities), and a self powered relay per se. However, in the case of self powered relays per se, the energy used by the relay electronics circuit is to be supplied with at least one measuring current sensor. This implies that the current sensors provide measurement of current including the power supply. Based on a power consumption of the control electronics, the current sensors VA capacity can be influenced. Further, the approach for power extraction from the current sensor can introduce distortion in the basic current sensor waveform due to dynamic impedance faced by the sensor owing to the specifications for restricting power dissipation over the operating current range. Such a specification can call for current sensors with greater VA capacity and greater linearity range. The current sensors can therefore be bulky. To address relay performance in this situation with at least possible current sensor size and VA, optimal balance of the control electronics design hardware and the associated software is desired.

U.S. Pat. No. 7,304,828 discloses an AC/DC intelligent solid state relay/breaker device with current/temperature sensing, time-delay overloads and over-current/over-temperature protection. In this disclosure, power MOSFETs or other transistors, control a load current. A bypass current sensing path monitors the MOSFET current and causes a shutdown through signal processing in the event of an over-current condition. Phase and earth fault protection are not disclosed because the device is used as a series element in a power flow configuration.

U.S. Patent Publication No. 20060007627 discloses an intelligent MOSFET based relay system that responds to a variety of influences. The relay system includes at least one relay, at least one peripheral sensor collecting data related to the relay system, and a control logic section linked to the relay and the sensor. The control logic section is further linked to a control computer via a communication interface. The control logic section intelligently controls operation of the relay based upon instructions received from the control computer and data collected via the at least one peripheral sensor and the relay. The system is adapted for use in a networked arrangement. The control computer is disclosed as passing instructions for controlling operation of relay.

Patent No. WO/2007/114951 is related to the field of industrial control systems, protection and control mechanisms and/or methodologies for electrical motors and other electrical devices. This document discloses protection and control of electrical devices, and can provide for wide-range current measurement, self-calibration, and wide-range line-powered electronics to provide application flexibility and reliability, and cost-effectiveness. An overload relay can be employed along with an electromagnetic contactor, consistent with the application, as a component in industrial control systems. This patent describes use of an auxiliary supply with applications for electrical motors.

U.S. Pat. No. 7,016,174 describes a system for an electronic trip unit whereby reliable instantaneous protection is provided. A multi-algorithmic approach uses an algorithm to detect bolted faults based on a direct comparison of the current and a threshold value, and an additional algorithm to detect current overloads based on a comparison of a peak-to-peak current and an additional current threshold. User configurability is not discussed in this patent.

In U.S. Pat. No. 7,248,451, a power controller is positioned within a current path between a line side and a load side of an electrical circuit. The power controller closes the current path in the presence of a control supply and opens the current path in the absence of the control supply. A power supply electrically connected to the current path provides the control supply. A sensor system receives power from the power supply, monitors current in the current path and outputs a sensor signal indicative of a current condition within the current path. A logic controller also receives power from the power supply, receives the sensor signal and removes the control supply from the power controller when the sensor signal does not satisfy established criteria. The sensor system may include either or both of: imbalance sensors for monitoring the current balance among two or more electrical lines; and over-current sensors for monitoring current in individual lines. The control of the supply-auxiliary power source indicates that the current relays used in the sensor system do not constitute a self-powered relay per se.

U.S. Patent Publication No. 20060050464 relates to a control system, such as a control system having a solid state relay in a hockey puck configuration for controlling power to a power-receiving load. A first bus bar and a second bus bar are configured to include a current sensing portion. A communication interface is adapted for compatibility with communications involving a WatBus™, Dallas Semiconductor one-wire protocol, a Seriplex, a sensor bus, a DeviceNet™, bus, a FMS, Lon Works, a Control Area Network (CAN), an Interbus S, an SDLC, AS-Interface (AS-i), a Local Interconnect bus (LIN-bus), an IEEE-1118 bus, a Profibus, Modbus RTU, an enterprise communication bus including an Ethernet TCP/IP, an Internet, a token ring LAN, an Ethernet LAN, an FDDI network, a private data network, an ISDN, and a VPN. This patent discusses a solid state relay with a variety of custom communication capacity.

U.S. Pat. No. 7,031,131 relates to an over-current protection device for detecting a current flowing through a conductor and for shutting off the current when the current exceeds a predetermined threshold value. A current sensor which constitutes an overload protection apparatus and senses a current supplied from a power source to a load is constituted by providing a magnetic sensor having the effect of magnetic impedance (MI), an AC supply which impresses AC on this sensor, a bias current supply means which supplies a bias current to a bias coil, a peak sensor which senses the peak or a change in impedance of the magnetic sensor as a change in voltage, and a switch which selects the output of the peak sensor in accordance with each phase. A holding device which holds switch outputs one after another and an amplification device are provided in common to enable current sensing for each phase. Thus, a range of current sensing is enlarged to reduce power consumption and cost. This patent discloses using an AC supply to impress the sensor, and using bias current supply for biasing bias coil.

U.S. Pat. No. 6,888,712 relates to a single protection device, including a transformer, an input circuit, and a switch circuit, suitable for addition to an electrical power system that includes a control panel electrically interconnected with a starter to control an electrical device. The patent discloses a starter with varied functional blocks.

U.S. Pat. No. 6,421,216 discloses an overcurrent protection system giving rapid response to relatively small overcurrents. It has a sensor element and an interruption element in series between a power source and a load. The sensor element is functionally linked to the circuit interruption element via a control element. When current exceeds a predetermined amount, the sensor element transfers heat to the control element, which causes the circuit interruption element to change from a conducting state to a non-conducting fault state. The control element may include a PTC device. This patent discloses thermal considerations-heat transfer for operations, versus electrical sensing of current magnitudes through interfacing current transformers.

U.S. Pat. No. 6,055,145A describes a microprocessor based overcurrent trip unit which generates trip signals as an adjustable function of current and time, and has a visual representation of the trip function on a front panel with 2-color LEDs associated with the trip function serving as indicators of trip conditions when red, and of a selected programmable parameter when green. The green LEDs flash to indicate a parameter selected for modification in a program mode and illuminate steady in a view mode.

U.S. Pat. No. 6,459,557 discloses a configurable overload relay selectively operable in a single-phase mode of operation and a multi-phase mode of operation configured to sense current flow through power conductors. The relay is further configured to determine a parameter related to the current flow, such as average current, vector sum of phase currents, and current imbalance, based on selection of either the single-phase or multi-phase mode of operation. Regardless of the selected mode of operation, the relay can provide protection for multiple types of power conductor fault conditions, including ground faults, overloads, and phase loss. The relay further can be configured to provide a reporting signal indicative of the value of the determined current-related parameter and/or the occurrence of the fault condition. Thus, the patent discloses two distinct modes of operation.

Patent No. RU2179775 discloses a reference-voltage source and 2 (two) AND gates whose outputs are connected to an input of a final element; a first input is connected to an output of an OR gate, and a second input is connected to an output of a signal shaper that functions to record critical overcurrent; other outputs of the signal shaper are connected to respective inputs of a time-setting circuit and the current sensor is inserted in series with a circuit under protection. First inputs of the signal shaper are connected to its output through a voltage divider and second inputs are connected to respective levels of reference voltages. In this way, the device provides for protecting DC and AC power circuits and realizes single-valued current and time settings due to a discrete principle of control. The patent discloses protecting DC and AC power circuits with gated logic without mention of an operating source of power.

U.S. Pat. No. 4,077,055 provides a self-powered self-contained ground fault protective device including a current monitor, an electronic circuit for amplifying the output of the current monitor, a relay connected to the amplifying circuit and adapted to operate whenever the ground fault current, through the current monitor, rises above a predetermined level, and an interchangeable rating plug for activating a circuit board switch. The current monitor, amplifying circuit, and relay are all supported and enclosed by a molded insulating housing. The rating plug is inserted into a socket on the exterior of the housing. This patent appears to be more of a mechanical plug in construction for ground fault instead of truly a self powered relay suited for phase faults.

Patent No. EP 0469207 discloses a self powered multiple phase circuit protection device including a plurality of current transformers connected in parallel with each other and adapted to be individually associated with one phase of a multiple phase load and for providing signals representing the current flowing in an associated phase. A switch is adapted to be actuated to interrupt power to the multiple phase loads, and a fault determining circuit is connected to the circuit transformers and to the switch for actuating the switch for at least one predetermined condition of the current signals. Functionality is average current based.

The disclosures of all of the foregoing documents are incorporated herein by reference in their entireties.

SUMMARY

A process of configuring a self-supplied relay is disclosed for providing phase and earth over current protection to electrical systems by current measurement, comprising: rectifying current from at least one current sensor via a full-bridge rectifier to provide a power supply; storing the power supply in a capacitor, three phases being connected in parallel with respect to the capacitor; reducing the capacitor voltage from a first voltage to a second voltage at a first stage by a first linear regulator, the second voltage being supplied to an analog sensing circuit, a trip coil energy reservoir, and a FLAG operation energy storage as a regulated voltage; reducing at least one of the first voltage and the second voltage to a third voltage at a second stage by a second linear regulator, the third voltage being supplied to a microcontroller; converting a current signal to a voltage signal via a shunt in series with a current path of the current sensor; and dividing the voltage signal via a voltage divider and a spike suppressor across the current sensor and supplying conditioned current via the voltage signal to the microcontroller to monitor a line current and a line current frequency.

A self-supplied relay for providing phase and earth over current protection to electrical systems is also disclosed, comprising: a full-bridge rectifier for rectifying current from at least one current sensor to provide a power supply; a capacitor for storing the power supply, three phases being connected in parallel with respect to the capacitor; a first linear regulator for reducing the capacitor voltage from a first voltage to a second voltage at a first stage, the second voltage being supplied to an analog sensing circuit, a trip coil energy reservoir, and a FLAG operation energy storage as a regulated voltage; a second linear regulator for reducing at least one of the first voltage and the second voltage to a third voltage at a second stage, the third voltage being supplied to a microcontroller; a shunt in series with a current path of the current sensor for converting a current signal to a voltage signal; and a voltage divider and spike suppressor across the current sensor for dividing the voltage signal and for supplying conditioned current via the voltage signal to the microcontroller for monitoring a line current and a line current frequency.

BRIEF DESCRIPTION OF THE DRAWINGS

Other features and advantages will become apparent to those skilled in the art upon reading the description of the preferred exemplary embodiments in conjunction with the accompanying drawings, wherein.

DETAILED DESCRIPTION

Exemplary embodiments as disclosed herein include a self-supplied standalone numeric controlled relay with accurate current measurement, optimum VA-capacity and linearity range adaptable for phase and earth fault protection.

To generate power from a current source, the current waveform can be rectified and energy stored into a capacitor. For a given current by an infinite current source, the full wave rectified current can support a defined amount of power at a defined bus voltage. The bus voltage changes as soon as the power demand changes provided the source current remains constant. Thus, to support a lower setting current, the power demand of a relay electronics circuit is minimized. The full wave rectified current generates a positive voltage energy source. Generating negative voltage from the positive voltage energy source is a loss of energy. This imposes a restriction on dual polarity supply availability for current signal conditioning. Even if a dual polarity supply is used, the current is measured in a differential mode across the current sensor secondary (prior to full wave rectifier). This can complicate the measurement circuit implementation and cost. A suitable way to measure current is by putting a shunt in series with rectifier circuit.

A secondary current of the current sensor, if interrupted, can result in destructive high voltage generation across the secondary terminals. A maximum current demand of the relay electronics circuit is limited. As the current source is an uninterruptible source of energy, at higher currents, the energy in the capacitor, after a rectifier, increases if the power demand by the electronics circuit is less than the power input. This can result in incremental high voltage generation across the capacitor leading to damage of the capacitor and to the rest of the electronics circuit. Thus, diversion of excessive energy back to the source with low impedance, is desirable.

As the load on the CT-secondary changes, its magnetization requirement can change. This can result in a variable secondary current. This effect can be more prominent at lower line currents when power control switch on times are small.

Few known products support truly self power operation. With restrictions or limitations imposed by a self powered relay configuration on measurement and power control, it is desirable to have greater accuracy for protection functions.

A process is therefore disclosed for configuring a stand-alone self-supplied numeric controlled relay for providing phase and earth over current protection to electrical systems by accurate current measurement.

A process is also disclosed for configuring a stand-alone self-supplied numeric controlled relay for providing phase and earth over current protection to electrical systems by accurate current measurement which exhibits optimum VA-capacity and linearity range.

A process is also disclosed for configuring a stand-alone self-supplied numeric controlled relay for providing phase and earth over current protection to electrical systems by accurate current measurement, which does not involve any auxiliary power supply to operate the internal electronic circuit.

A process is also disclosed of configuring a stand-alone self-supplied numeric controlled relay for providing phase and earth over current protection to electrical systems by accurate current measurement, which is compact, and derives power from the current sensing transformers.

As disclosed herein, an exemplary process for configuration of a phase and earth over-current protection relay to electrical systems by accurate current measurement involves a self powered relay which does not include an auxiliary power supply to operate the electronics circuit within. It derives operating power from the current sensors. It involves minimum current in at least single phase to start on. An exemplary current is 60 mA, which is a sum of the phase current through a MOSFET irrespective of the individual phase current magnitude. It is suitable where no auxiliary power available as the relay derives power from the current sensing transformers. A current setting range is, for example, from 7.2 A to 8960 A that is divided in 5 different ranges supported by 5 sets of current transformers. It can provide earth current measurement through internal soft calculation or external current transformer (Core Balance Current Transformer) with, for example, 1 Amp nominal secondary current.

An arrangement is also disclosed for accurate current measurement with control algorithms for power control by providing amplified and conditioned current for optimization between the current used to power an electronic circuit and the fidelity of a measured current waveform, so that they are both at acceptable levels at the same time. This disclosure describes the current sensing and associated algorithm for power control in a truly self powered relay.

According to an exemplary embodiment of the disclosure, the relay senses the phase currents through three phase current sensors.

According to another exemplary embodiment of the disclosure, the relay estimates earth current internally through soft calculations.

According to a still another exemplary embodiment of the disclosure, the earth current measurement is performed through an external earth current interface. Either an internal or external earth current measurement is possible and is selectable.

In a further exemplary embodiment of the disclosure, a reference current for the relay can be set through mechanical DIP switches. If the sensed current exceeds the reference current, the relay releases trip energy after a specific time duration depending upon the selected time-current characteristic.

In another exemplary embodiment of the disclosure, the released energy can be supplied to trip coils of circuit breakers to clear an over current fault.

According to exemplary embodiments of the disclosure, the relay accepts remote tripping command also termed as a binary Input, and for every trip generation, the relay sets an indicator termed as a flag or flip indicator, which can be reset using a push button interface when the system and the relay are healthy and functional.

In case of any internal relay fault (hardware and software) the relay can generate an Internal Relay Fault indication.

The relay can sense DC offset, inrush current, THD (Total Harmonic Distortion), frequency change (e.g., 45 Hz to 65 Hz), and can support as many as eight or more selectable fault characteristic curves both for phase and earth fault clearance.

The relay is adaptable in Ring Main Units (RMU) within the distribution network, and can provide energy release for trip coils used in RMU.

The relay can be used in secondary distribution and in primary distribution as well.

The relay has use in system protection and control, and design concepts as well as algorithms can be adapted for transducers and metering purposes, including signaling and control applications, industrial instrumentation, process automation.

As disclosed herein, different IDMT (Inverse Definite Minimum Time) curves can be used for both phase and earth over current protection including providing remote trip input, unit ready and internal relay fault indications through the LEDs.

Phase and earth over current fault indications can be provided through a manually resetable electromechanical FLAG, and a coarse current setting through mechanical binary (DIP) switches in a base version.

Finer settings and data retrieval can be interfaced through a battery powered add on human-machine interface (HMI) with keyboard and display, including test inputs for on site testing of individual phase/earth channel and relay functionality up to a trip output.

A fail safe trip release can be included when a micro controller fails and phase currents are reaching, for example, 20 times the rated current of current transformers. For fault currents above 20 times the rated CT current, the relay releases trip with, for example, 40 msec delay.

A current measurement and sensing arrangement has been developed using control algorithms including: MOSFET and Darlington pair circuits to control power and protect the electronics circuit, another circuit or a computer/microprocessor, a power supply including a capacitor arranged to accumulate charge, a current sensing shunt resistor and a current sensing circuit. A micro-controller can monitor the quality of grid power and provide the protection function of the connected equipment.

Figure 1:
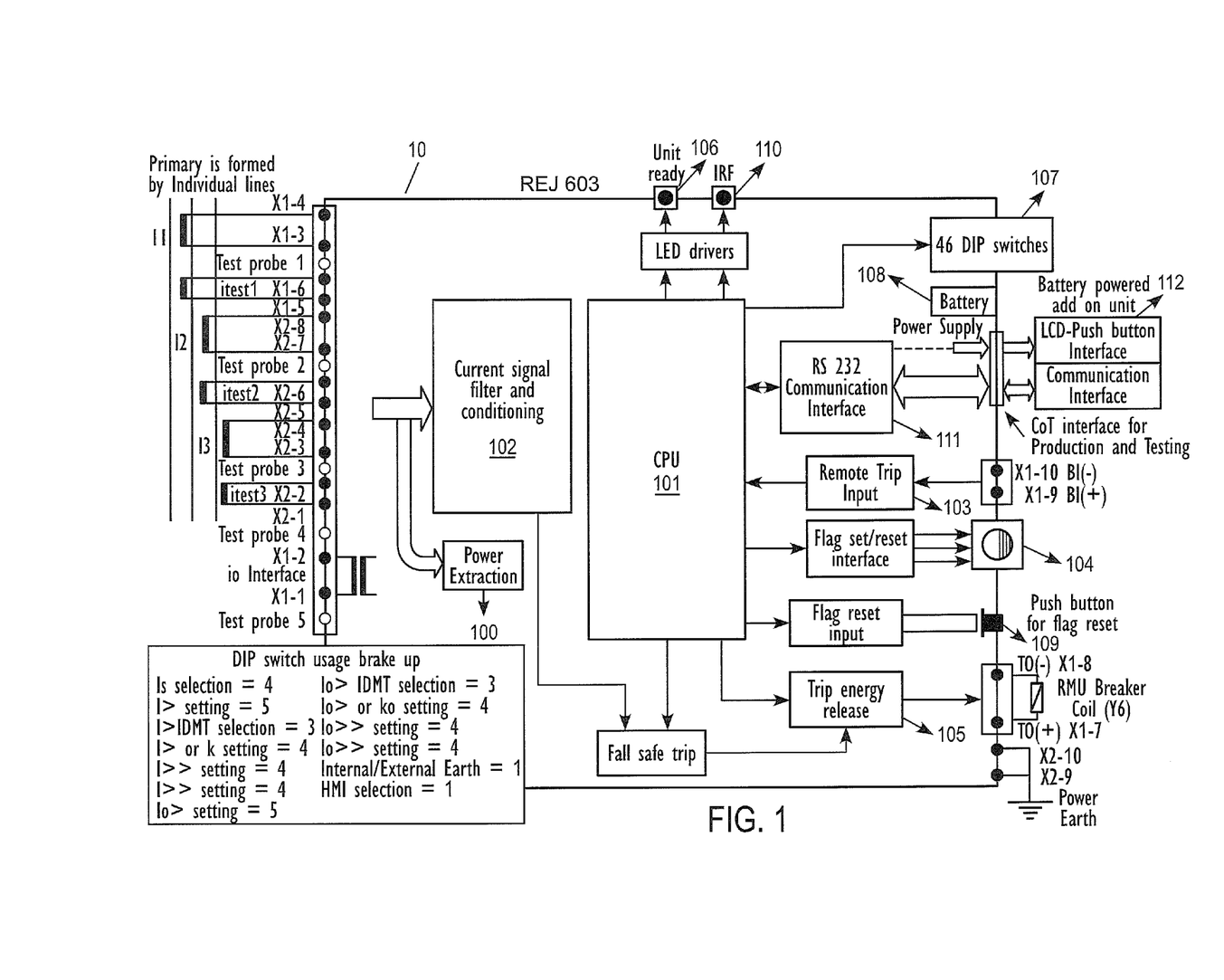
FIG. 1 shows a block diagram of an exemplary current sensing relay/switch mechanism, and control and display arrangement.

FIG. 1 illustrates a block diagram of an exemplary power control, current sensing, switch mechanism, control and display arrangement for a self powered relay 10. This relay 10 can operate without any auxiliary power supply. It can derive power for a relay electronics circuit from the current sensors.

The power supply 100 can be charged by rectifying current from the current sensors with a full bridge rectifier and storing it in a bus capacitor. Three phases can be connected in parallel with respect to the capacitor.

The bus capacitor voltage is 24V under exemplary operating conditions, and can be reduced to +3.3V by using a switching regulator. The +3.3V supply is used for a micro controller 101 and peripherals. Another exemplary +12V supply can be made available using a linear regulator from the 24V bus voltage. The +12V supply can be used for supplying the analog current sensing circuit 102, FLAG operation energy storage 104 and trip coil energy reservoir 105. From a regulated +12V, a reference voltage of +3.3V for the controller 101 can be generated via a linear regulator.

There is a shunt in series with the current path of the current transformer (CT) secondary. The shunt converts a current signal into a voltage signal. The voltage signal can be divided using a potential divider. There is a spike suppressor across current sensing network 102. The conditioned current, after operational amplifier stages, is fed to a built-in A/D converter of the micro-controller 101. The same voltage signal across the shunt goes through a zero cross detection network to the A/D converter to the micro-controller 101. The micro-controller 101 based on the above information monitors line current and line current frequency.

The micro-controller 101 monitors line current and quality. It detects the DC offset present in the current waveform. DC offset arises in the system in case of any fault leading to over current. It also detects in-rush current. In-rush current arises in the system in case of hard switching of any highly inductive load. It further detects THD present in the system. Harmonic distortion arises in the system due to switching loads like an inverter etc. The micro-controller 101 senses over current situations in the system. The over current situation is defined as line current greater than a set current fed to the micro-controller 101 through mechanical DIP switches 107. In case of over current situations, the micro-controller 101 checks for presence of DC offset, in rush current and THD present in the line current. Micro-controller 101 discounts effects of DC offset, in rush current and THD up to for example 30% to calculate over current conditions. In case of an estimated over current condition, the micro-controller 101 releases trip energy to a switch mechanism outside the relay 10 that further isolates the equipment or section of the power system from over the current fault condition. The micro-controller 101 gets set current information from the DIP switch matrix 107.

The micro-controller 101 also accepts a conditioned signal from remote location 103 through binary input BI section. On receipt of a signal from the BI section, the micro-controller 101 releases trip energy to the external switch mechanism.

The micro-controller 101 can communicate with battery 108 powered add on HMI unit 112. The same communication port can be exploited for production time testing. This communication port is not available for the user.

The micro-controller 101 issues a FLAG set 104 signal to set an externally visible FLAG in the event of any trip energy release 105. It also acknowledges a FLAG reset 104 signal from an external push button 109 and resets the FLAG.

In case of an all healthy condition of hardware and software, the micro-controller 101 enables unit ready LED 106. In case of an unhealthy condition of hardware or software, the micro-controller 101 enables internal relay fault LED 110.

In an exemplary embodiment of the present disclosure, an LPC 2138 micro controller 101 from NXP (earlier Phillips Semiconductors) based on an ARM 7 architecture has been used. The controller 101 is programmed to achieve functionality as described by a specialized embedded code involving the above described functions and the basic product functionality.

Front panel components for a base relay can include indications through LEDs 106, bi-settable flag 104, DIP switches 107, push button 109 and multi pin connectors. An add-on module interface on the rear side can have a matched mating connector for interfacing with the base relay. RS232 communication interface 111 is provided to connect the controller 101 with an LCD push button interface and communication interface 112.

Figure 2:
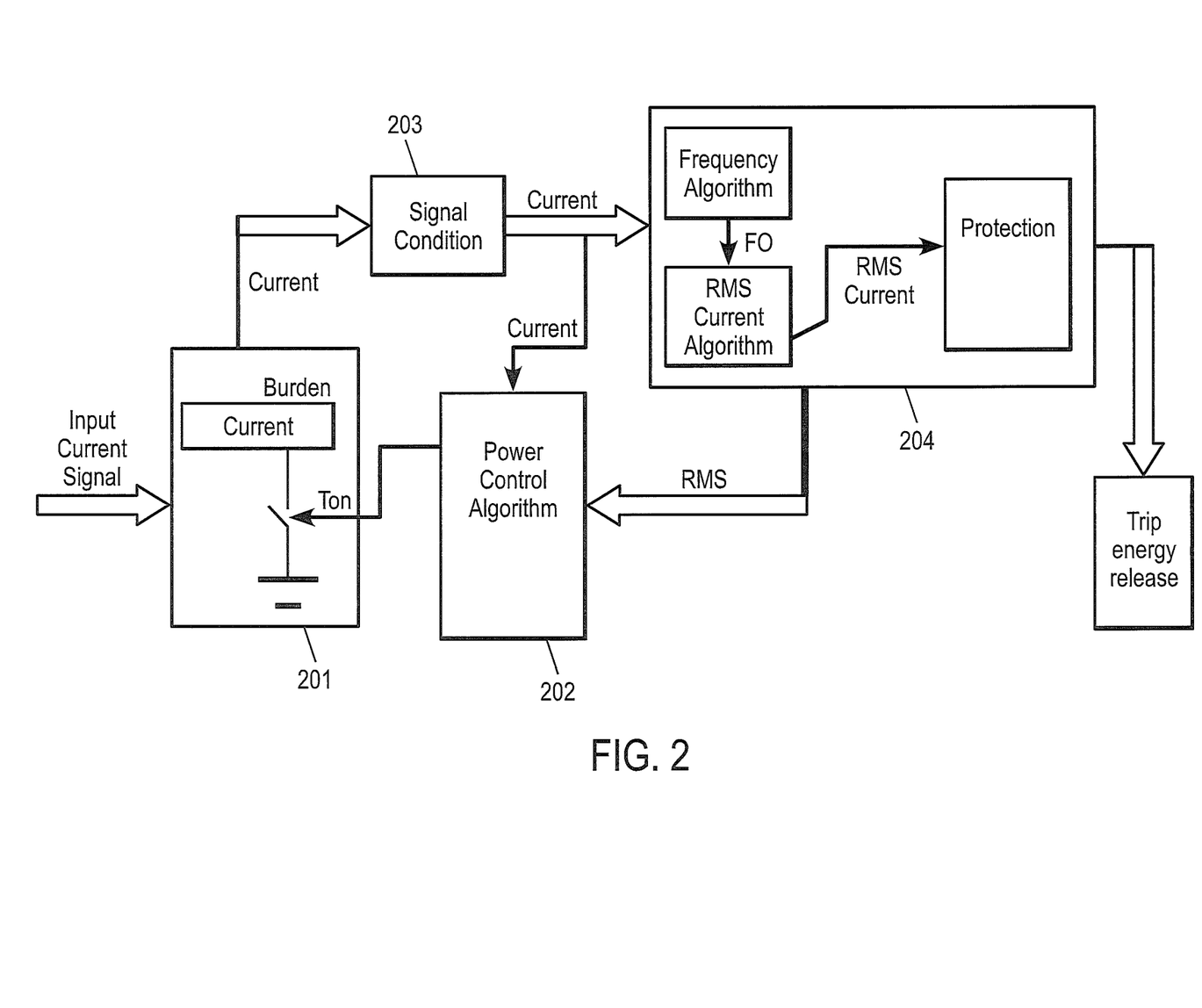
FIG. 2 shows a schematic diagram of an exemplary process according to the disclosure.

FIG. 2 shows an exemplary process according to the disclosure, which is as follows:

1) Block 201: Burden

The burden 201 includes (e.g., consists of) a switching load in series with a current sense shunt resistor. When the switch is ON, a whole load is bypassed and when the switch is OFF the whole load, in series with shunt resistor for current sensing, appears across the current transformer secondary. The current sense resistor converts a current signal into a voltage signal.

2) Block 202: Power Control Algorithm

Figure 3:
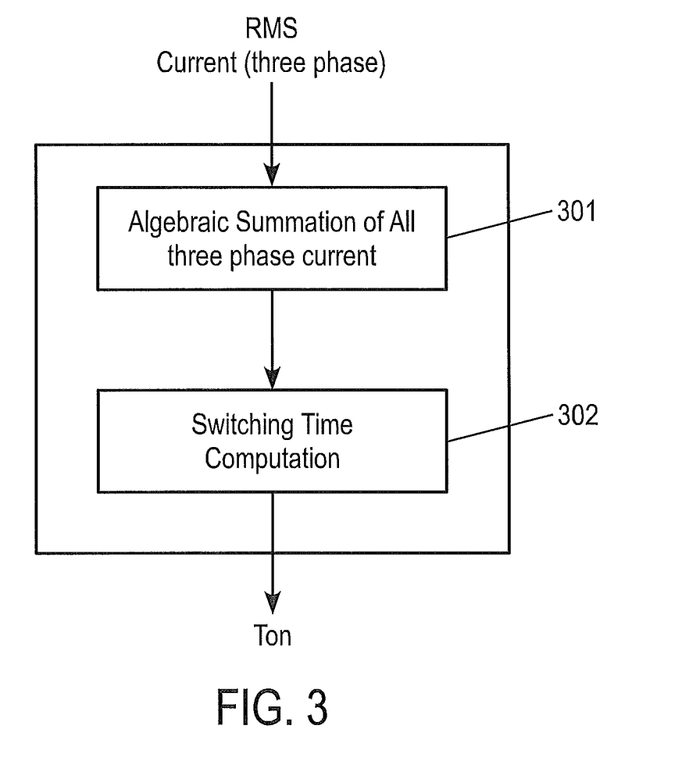
FIG. 3 shows a flow-chart for an exemplary power control according to the disclosure.

The block 202 decides switching device "ON time" to control power and measure current. A separate, exemplary power control algorithm is shown in FIG. 3. This block takes three phase RMS current as an input signal and based on the algebraic sum of all three phase currents 301, the control algorithm decides "ON time" or switching time 302 for the switching elements.

3) Block 203: Signal Conditioning

A single polarity voltage is generated. Hardware filtration of a current signal is not possible due to the various reasons. High frequency current spikes can be filtered through ceramic capacitors across the current sense resistors. The sensed currents are passed through three different gain amplifiers to get optimal signal amplitude for measurement over the whole exemplary operating current range of 75 mA to 5.83 A. The same signal across the current sense resistor is used to identify zero cross over. This is used for frequency estimation as well for current measurement algorithms.

4) Block 204: Relay Algorithm.

This block 204 contains mainly digital signal processing modules and also contains the protection algorithm (separately shown in FIG. 5) and on that basis it generates a trip signal. This block contains frequency estimation, RMS current estimation and protection modules. Based on the frequency estimation the software synchronizes with the estimated frequency.

Figure 4:
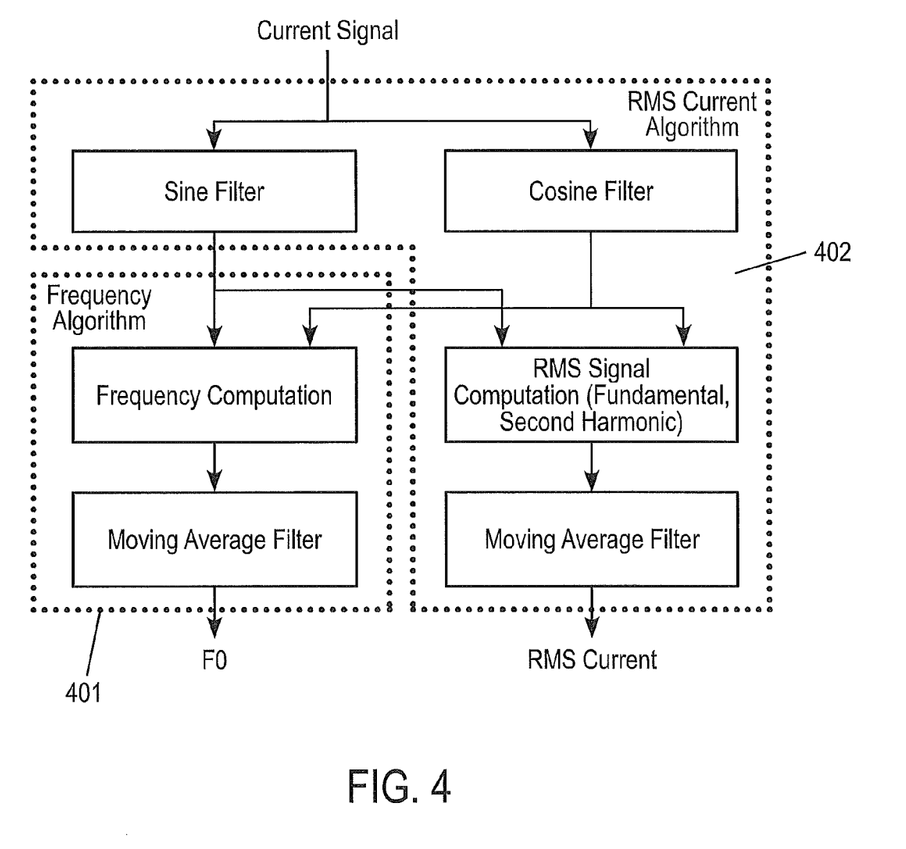
FIG. 4 shows a flow-chart of an exemplary RMS current estimation according to the disclosure.

Referring to FIG. 4, based on frequency estimation by frequency algorithm 401, RMS current algorithm 402 computes an RMS value of the input current signal, which is the deciding parameter for the power control as well as trip signal generation.

Figure 5:
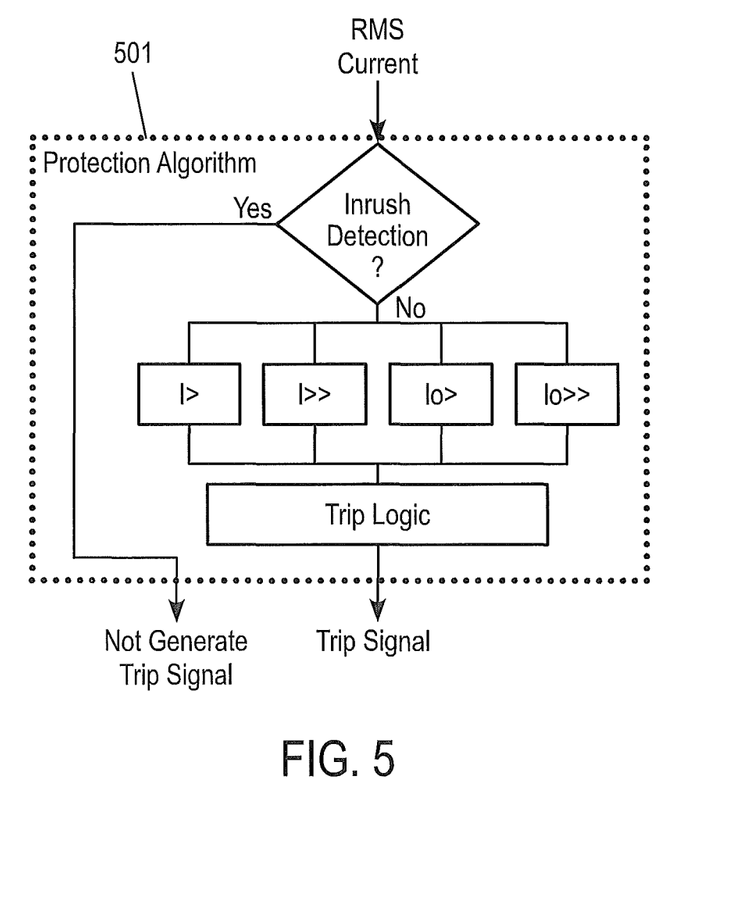
FIG. 5 shows a flow-chart of an exemplary protection scheme according to the disclosure.

Protection algorithm 501 is shown in FIG. 5. Here the RMS current algorithm also takes care of DC offset calculation, Inrush current identification & the Total Harmonic Distortion (THD) estimation. In FIG. 5 "I>" represents low set current setting, I>> represents high set phase current setting; Io> represents low set earth current setting and Io>> represents high set earth current setting.

Accurate current measurement in self powered relays using unique current sensing and power control algorithm is discussed below.

Figure 6:
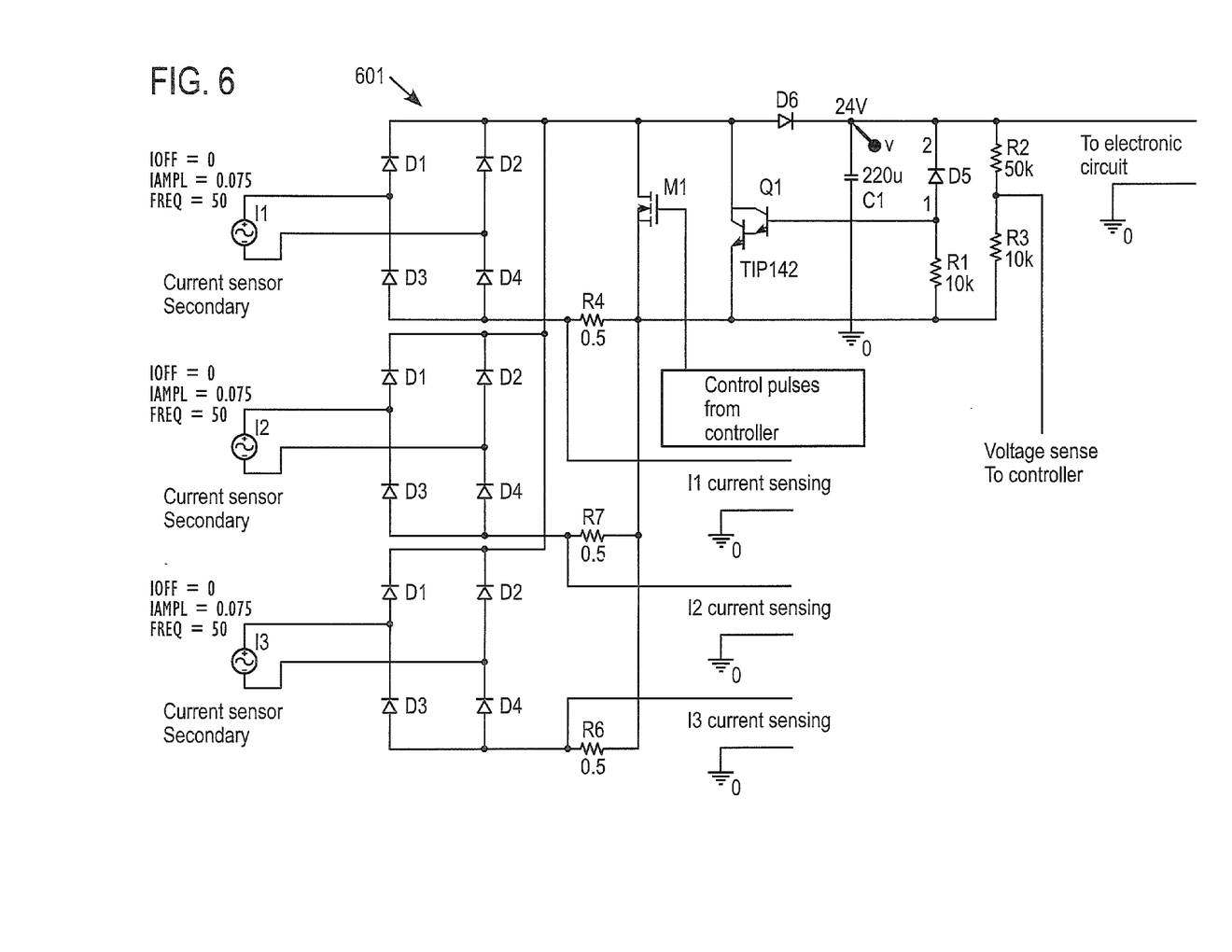
FIG. 6 shows an indicative diagram for an exemplary power extraction and current sensing scheme according to the disclosure.

Referring to FIG. 6, an exemplary diagram for a power extraction and current sensing scheme 601 is shown wherein the three phase currents I1, I2, I3 are rectified to charge the bus capacitor C1 in parallel. The full wave rectified current is sensed with reversed ground. The filtered (noise filter RC) negative current with respect to ground is reversed through a front end single supply OP AMP (operational amplifier) stage and conditioned to be able to be read by the controller. As discussed in previous sections, the load impedance is variable due to a charging and discharging profile of the capacitor voltage. For measurement purposes it is desirable that the impedance seen by the current source remains constant. This is the case when MOSFET M1 is ON. Therefore, current measurement happens when MOSFET M1 is ON. For measurement the MOSFET M1 is made ON for a specific duration (e.g., 100 µsec at least) at an exemplary rate of 20 samples per cycle. All the three phase currents I1, I2 and I3 are sensed during this period. However, MOSFET M1 ON time can be greater than 100 µsec depending upon the source current.

Figure 7:
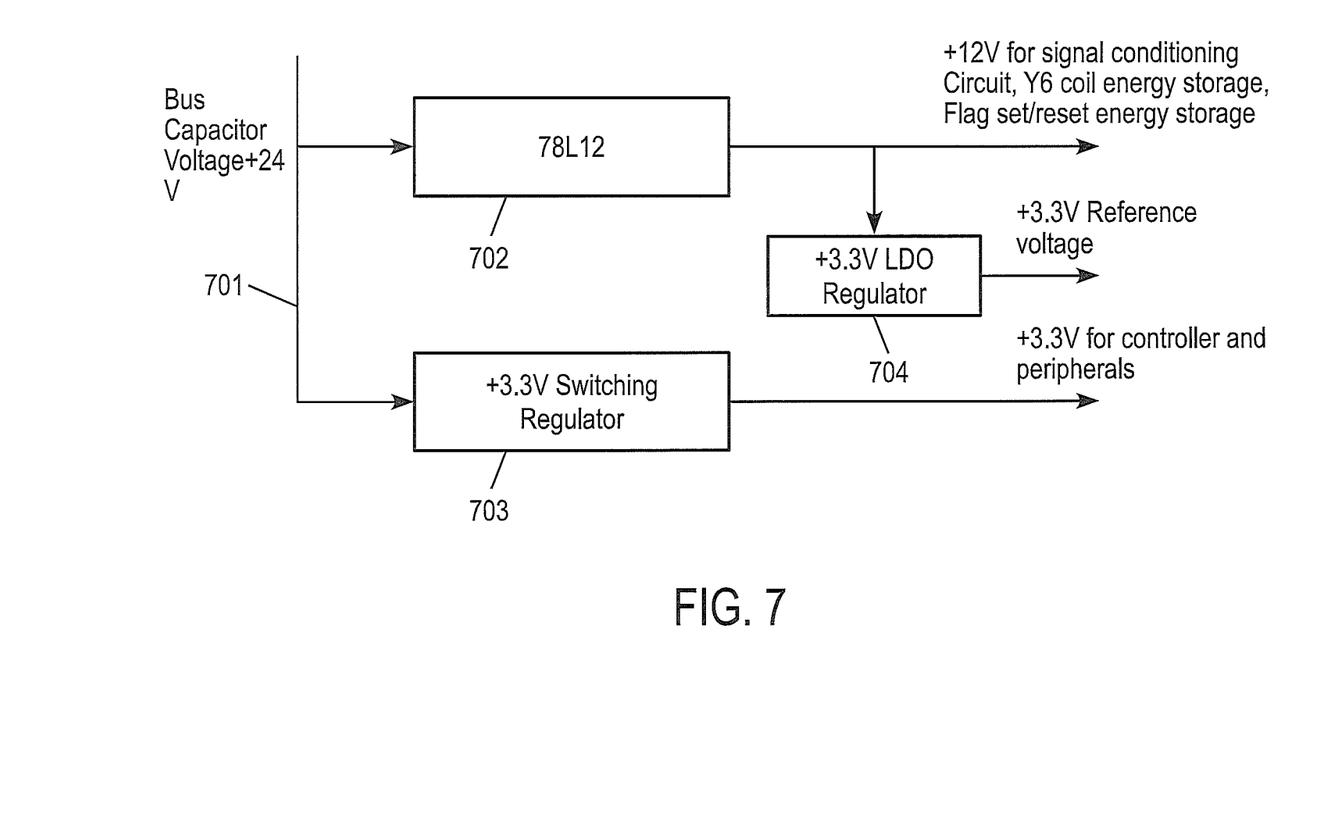
FIG. 7 shows an exemplary power distribution scheme according to the disclosure.

An exemplary power distribution system is shown in FIG. 7. The sensed bus voltage via a potential divider is given to the controller. The bus capacitor voltage 701 is 24V under exemplary operating conditions. The current sensing scheme exploits a single polarity (+ve) supply. The bus voltage is fed to an exemplary +12V linear regulator 702 to generate power for an analog circuit (current conditioning circuit), the trip release reservoir and trip indicator flag reservoir. The same bus voltage is fed to the switching regulator 703 that generates +3.3V for logic level digital circuits (controller and peripherals). +3.3V linear regulator 704 follows the regulated +12V for +3.3V reference generation.

Power Control:

The power input source is a definite set of current transformers for each phase. At a given time, one set of current transformers is used. To accommodate a possibility that only one of the three phases is available, the electronic circuit is configured to be functional in such condition. As the output of the current sensor depends upon input current and it cannot be kept open or exposed to high impedance, the current loop is closed. At the same time, as the current loop should be interrupted, the energy transfer is continuous and increases as the input current increases. If the energy is not controlled or dissipated, the bus voltage increases indefinitely as the power from the electronics circuit is limited. This can finally result in failure of the capacitor and electronics circuit.

An exemplary option is to supply excessive current from the source with low impedance (low impedance bypass is used to avoid heat dissipation) back to the source. This can be done by using a very low impedance MOSFET M1 across the bus capacitor C1. The diode D6 can be used to avoid bus capacitor energy release through the MOSFET M1 when it is on.

PWM Algorithms for Power Control:

As the current specification from the electronics load is defined, the voltage level across the bus capacitor is indicative of energy available from source. As load current is constant, power depends upon bus voltage available. As per power demand, the energy level in the capacitor changes with time. This results in variation of capacitor bus voltage. If the power demand is constant, the additional energy results in an increment of voltage across the bus capacitor. Similarly, if the power demand is constant and there is reduction in input energy to the bus capacitor, it results in the reduction in voltage level of the bus capacitor. In the present case, input current from current sensors for three phases is indicative of energy insurgence from source. This effect is a basis for an indirect bus voltage control algorithm.

The individual phase current can be sensed and based on an algebraic sum of three phase current through MOSFET M1 the fixed duty cycle PWM pattern can be generated. This can avoid an unbalanced impedance as seen by current transformer for positive and negative half cycles. Such an algorithm can control power dynamically as well as avoid current sensor saturation. With this type of control in actual relay hardware, the bus capacitor voltage is kept greater than, for example, 22V. It is then controlled at around 24V by zener diode D5 along with Darlington pair transistor Q1.

For measurement purposes, the impedance seen by the current source should remain constant. This is the case when MOSFET M1 is ON. Therefore, current measurement should happen when MOSFET M1 is ON. Due to this, the MOSFET M1 is on for specific duration (e.g., 100 μsec) at a rate of for example 20 samples per cycle. All the three phase currents are sensed during this period.

According to other exemplary embodiments of the present disclosure, the system can include indications and push buttons. A green LED can be used for a relay protection function ready indication and a red LED can be used for an internal relay fault indication. A bistable flag can be used for latched trip indication, which is resetable by a user using a push button. The disclosure also includes 46 DIP switches divided in 13 different subgroups for the relay settings specified by the user. There is provision for a flag reset without removing the front cover and the relay can be reset when it is powered on and ready. Multi-pin connectors provide an add-on module interface by having a communication port/production testing communication and battery interface to a power add-on module via a base relay circuit board.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A process of configuring a self-supplied relay for providing phase and earth over current protection to electrical systems by current measurement, comprising:
rectifying current from at least one current sensor via a full-bridge rectifier to provide a power supply;
storing the power supply in a capacitor, three phases being connected in parallel with respect to the capacitor;
reducing the capacitor voltage from a first voltage to a second voltage at a first stage by a first linear regulator, the second voltage being supplied to an analog sensing circuit, a trip coil energy reservoir, and a FLAG operation energy storage as a regulated voltage;
reducing at least one of the first voltage and the second voltage to a third voltage at a second stage by a second linear regulator, the third voltage being supplied to a microcontroller;
converting a current signal to a voltage signal via a shunt in series with a current path of the current sensor; and
dividing the voltage signal via a voltage divider and a spike suppressor across the current sensor and supplying conditioned current via the voltage signal to the microcontroller to monitor a line current and a line current frequency.

2. The process as claimed in claim 1, wherein the monitoring of line current and line current frequency comprises:
estimating an over-current condition through sensing by the microcontroller even in presence of DC-offset, in-rush current, and THD; and
releasing trip energy in case of an over-current condition to a switch mechanism disposed outside the relay.

3. The process as claimed in claim 1, comprising:
releasing trip energy via the microcontroller on receipt of a conditioned signal from a remote location in a binary input section.

4. The process as claimed in claim 1, comprising:
enabling the microcontroller to communicate with a battery-power add-on HMI unit.

5. The process as claimed in claim 1, comprising:
acknowledging a flag-reset signal from an external push button to reset a flag via the microcontroller on release of a trip energy issue.

6. The process as claimed in claim 1, comprising:
enabling, via the microcontroller, a LED to indicate a unit-ready signal when a hardware and software structure of the relay is in a healthy state, and enabling a LED to indicate an internal-relay fault when the hardware and/or software is in an unhealthy state.

7. The process as claimed in claim 1, comprising:
providing, via a support software structure, power control, signal conditioning, calculation modules for DC offset, in-rush current, and total harmonic distortion, and relay protection.

8. The process as claimed in claim 6, wherein the first voltage is 24V, the second voltage is 12V and the third voltage is 3.3V.

9. The process as claimed in claim 1, comprising:
controlling impedance of the shunt for current measurement and supply of power to the self-supplied relay.

10. The process as claimed in claim 9, wherein the controlling includes:
maintaining the impedance constant during a current measurement, and avoiding current sensor saturation.

11. A self-supplied relay for providing phase and earth over current protection to electrical systems, comprising:
a full-bridge rectifier for rectifying current from at least one current sensor to provide a power supply;
a capacitor for storing the power supply, three phases being connected in parallel with respect to the capacitor;
a first linear regulator for reducing the capacitor voltage from a first voltage to a second voltage at a first stage, the second voltage being supplied to an analog sensing circuit, a trip coil energy reservoir, and a FLAG operation energy storage as a regulated voltage;
a second linear regulator for reducing at least one of the first voltage and the second voltage to a third voltage at a second stage, the third voltage being supplied to a microcontroller;
a shunt in series with a current path of the current sensor for converting a current signal to a voltage signal; and
a voltage divider and spike suppressor across the current sensor for dividing the voltage signal and for supplying conditioned current via the voltage signal to the microcontroller for monitoring a line current and a line current frequency.

12. The relay as claimed in claim 11, wherein the microcontroller estimates an over-current condition even in presence of DC-offset, in-rush current, and THD, and releases trip energy in case of an over-current condition to a switch mechanism disposed outside the relay.

13. The relay as claimed in claim 11, wherein the microcontroller releases trip energy on receipt of a conditioned signal from a remote location in a binary input section.

14. The relay as claimed in claim 11, wherein the microcontroller communicates with a battery-power add-on HMI unit.

15. The relay as claimed in claim 11, wherein the microcontroller acknowledges a flag-reset signal from an external push button to reset a flag on release of a trip energy issue.

16. The relay as claimed in claim 11, wherein the microcontroller enables a LED to indicate a unit-ready signal when a hardware and software structure of the relay is in a healthy state, and enables a LED to indicate an internal-relay fault when the hardware and/or software is in an unhealthy state.

17. The relay as claimed in claim 11, comprising:
   a support software structure having power control, signal conditioning, calculation modules for DC offset, in-rush current, and total harmonic distortion, and relay protection.

18. The relay as claimed in claim 11, wherein the first voltage is 24V, the second voltage is 12V and the third voltage is 3.3V.

19. The relay as claimed in claim 11, wherein the micro controller controls impedance of the shunt for current measurement and supply of power to the self-supplied relay.

20. The relay as claimed in claim 11, wherein the current sensor comprises:
   a current transformer having a secondary in series with the shunt.

* * * * *